United States Patent
Liu et al.

(10) Patent No.: US 7,866,874 B2
(45) Date of Patent: Jan. 11, 2011

(54) BACKLIGHT MODULE HAVING REPLACEABLE LIGHT APPARATUS

(75) Inventors: Keng-ju Liu, Hsin-Chu (TW); Wen-yuan Cheng, Hsin-Chu (TW); Chi-chih Chu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 359 days.

(21) Appl. No.: 12/177,578

(22) Filed: Jul. 22, 2008

(65) Prior Publication Data

US 2009/0290381 A1 Nov. 26, 2009

(30) Foreign Application Priority Data

May 23, 2008 (TW) .............................. 97119222 A

(51) Int. Cl.
F21V 8/00 (2006.01)
(52) U.S. Cl. .................... 362/634; 362/613; 362/612; 362/285; 362/396; 362/97.2
(58) Field of Classification Search ......... 362/632–634, 362/611–613, 97.1–97.3, 285, 396, 249.1, 362/647
See application file for complete search history.

(56) References Cited

U.S. PATENT DOCUMENTS

| | | | |
|---|---|---|---|
| 5,280,372 A | 1/1994 | Horiuchi | |
| 5,420,710 A | 5/1995 | Nanbu | |
| 5,537,296 A | 7/1996 | Kimura et al. | |
| 5,666,172 A | 9/1997 | Ida et al. | |
| 5,921,819 A | 7/1999 | Lee | |
| 7,093,970 B2* | 8/2006 | Jang | 362/632 |
| 7,217,004 B2 | 5/2007 | Park et al. | |
| 7,441,938 B2* | 10/2008 | Sakai et al. | 362/634 |
| 7,591,578 B2* | 9/2009 | Chang | 362/612 |
| 2005/0243576 A1 | 11/2005 | Park et al. | |
| 2009/0128732 A1* | 5/2009 | Hamada | 349/58 |

FOREIGN PATENT DOCUMENTS

CN 2583900 Y 10/2003

* cited by examiner

*Primary Examiner*—Sandra L O Shea
*Assistant Examiner*—Leah S Lovell
(74) *Attorney, Agent, or Firm*—Kirton & McConkie; Evan R. Witt

(57) ABSTRACT

The present invention discloses a backlight module having replaceable light apparatus. The backlight module includes the replaceable light apparatus, a back plate and a frame body. The replaceable light apparatus includes a light control circuit, a securing device and conducting wires. The light control circuit is adapted to a frame body and a back plate of the backlight module. Additionally, the light control circuit has a plurality of light sources, a first end portion and a second end portion. The securing device has a supporting housing which has a position protrusion and a clamping portion for supporting the first end portion of the light control circuit along a first direction (X) and a third direction (Z). The clamping portion clamps the first end portion of the light control circuit along a second direction (Y) and the third direction (Z).

22 Claims, 6 Drawing Sheets

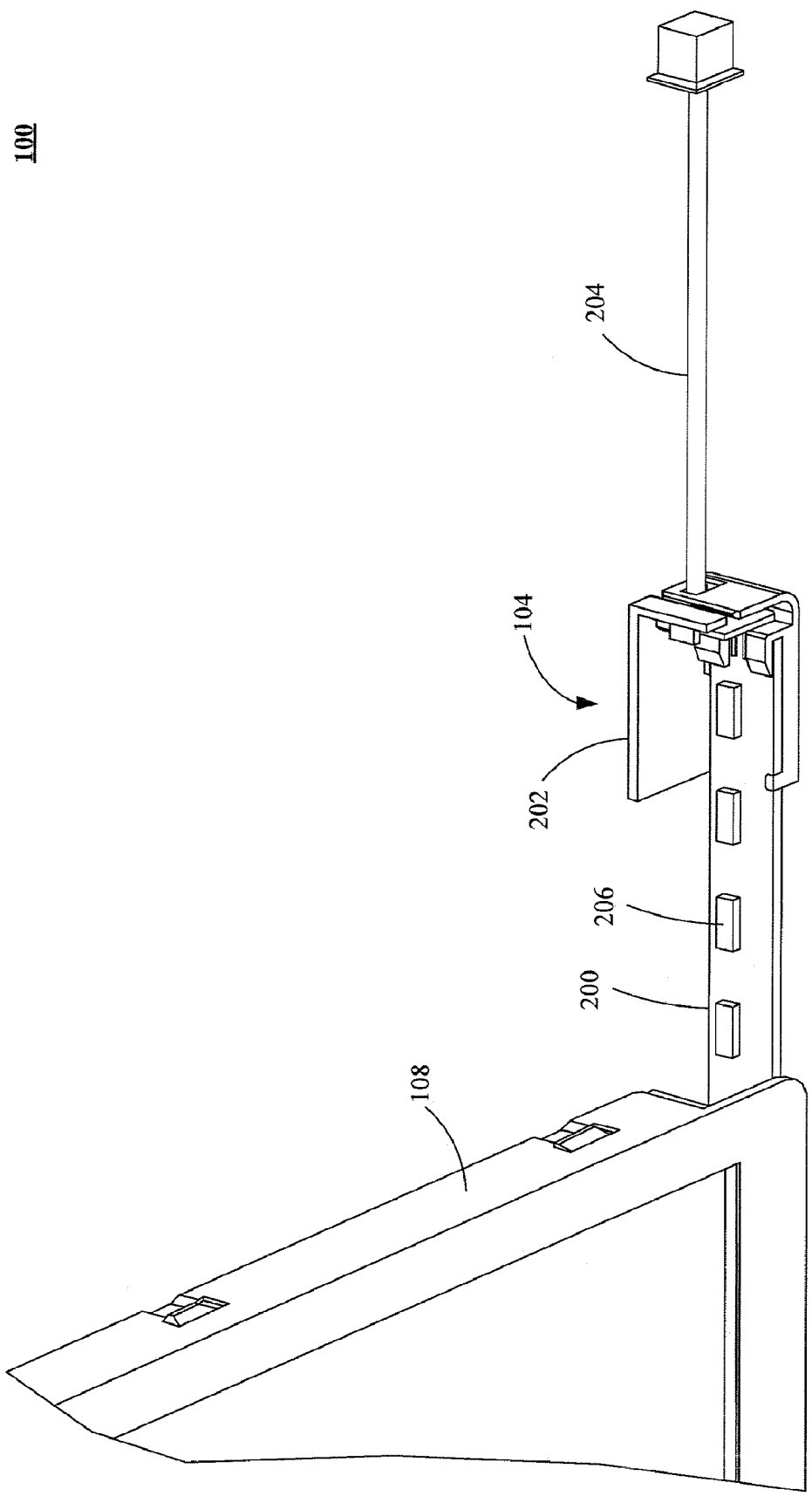

BACKLIGHT MODULE HAVING REPLACEABLE LIGHT APPARATUS

FIELD OF THE INVENTION

The present invention relates to a light apparatus, and more particularly relates to a replaceable light apparatus applicable to the backlight module of the liquid crystal display panel.

BACKGROUND OF THE INVENTION

With the rapid development and great progress of display technology, the applications of the display devices are widely utilized. Particularly, liquid crystal display (LCD) panels are extensively used in various electronic products, such as computer monitors and LCD televisions. Conventionally, the light system of the backlight module of the LCD panel is fastened to the backlight module. In this case, rubber caps are capped with the end portions of the lamp tube, the conducting wires extends from the rubber caps to the lamp tube outwardly, and the lamp tube is then directly plugged into the back plate of backlight module.

However, such an arrangement of the light system has two drawbacks: (1) because the lamp tube is equipped with the rubber caps and secured to the back plate therein, the lamp tube cannot be easily changed while the lamp tube has a breakdown and needs to be replaced; and (2) since the light system is plugged into the internal space of the back plate, the maintenance worker is unable to disassemble the light system from the back plate when the conducting wires or the circuit board connected to the lamp tube are damaged, thereby resulting in breakdown of the light system. The monitor with the LCD panel is no longer serviceable or usable so that life span of the monitor is severely reduced. Consequently, there is a need to improve the conventional light system of the backlight module.

SUMMARY OF THE INVENTION

One objective of the present invention is to provide a replaceable light apparatus for flexibly assembling the light apparatus of the display to simplify the manufacturing processes of the displays while the light apparatus is positioned in the backlight module.

Another objective of the present invention is to provide a replaceable light apparatus for easily disassembling the light apparatus to increase the life span of the display device while maintaining the display.

According to the objectives, the present invention sets forth a replaceable light apparatus applicable to display devices, such as LCD panels and/or LCD television sets. The replaceable light apparatus includes a light control circuit, a securing device and conducting wires. The light control circuit is adapted to a frame body and a back plate of the backlight module. Additionally, the light control circuit has a plurality of light sources, a first end portion and a second end portion. The securing device has a supporting housing which has a position protrusion and a clamping portion for supporting the first end portion of the light control circuit along a first direction (X) and a third direction (Z). That is, the movement of the light control circuit is restricted along the first direction (X) and the third direction (Z). The clamping portion clamps the first end portion of the light control circuit along a second direction (Y) and a third direction (Z). That is, the clamping portion restricts the movement of the light control circuit to the second direction (Y) and the third direction (Z).

Therefore, while the light control circuit is connected to the securing device, the light control circuit and the securing device stably construct the replaceable light apparatus because the movement of the light control circuit is restricted at the first direction (X), the second direction (Y) and the third direction (Z).

The light module includes the light control circuit, the securing device, a back plate and a frame body. The back plate guides the light control circuit to the back plate therein. The frame body supports the light control circuit. The back plate further comprises a guiding structure having a guiding pole, a guiding side and a stop device (not shown). The guiding pole and the guiding side construct an opening for guiding the second end portion of the light control circuit to be positioned in the frame body along the opening.

While the replaceable light apparatus is put into the space between the back plate and the frame body, the fastener of the supporting housing buckles a buckling hole of the back plate. Further, at least one second slot of the supporting housing allows the fastener to be flexibly buckled to the buckling hole. Moreover, the second recess region in the first side plate of the securing device is plugged into the recess so that the replaceable light apparatus is fastened to the back plate along the inverse direction of the first direction (X). In addition, the position pin of the securing device extends along the first direction (X) so that the securing device is stably inserted to the insertion hole of the frame body.

Consequently, the replaceable light apparatus utilizes the fastener, the second recess region and the position pin to be coupled to the buckling hole, the recess and the insertion hole, respectively. Thus, the replaceable light apparatus tightly connects to the light module and the frame body, respectively, for stably fastening the securing device to the light module and light leakage from the light module and the frame body is avoided.

In comparison with the prior art, the replaceable light apparatus in the present invention has more flexible in view of installation and maintenance for simplifying the manufacturing and maintaining processes of the display. Additionally, the light apparatus can be easily disassembled to increase the life span of the display device.

BRIEF DESCRIPTION OF THE DRAWINGS

The foregoing aspects and many of the attendant advantages of this invention will become more readily appreciated as the same becomes better understood by a reference to the following detailed description, when taken in conjunction with the accompanying drawings, wherein:

FIG. 5 is a partial three-dimensional schematic view of a light module having a replaceable light apparatus in third visual angle according to one embodiment of the present invention.

DETAILED DESCRIPTION OF THE INVENTION

Figure 1:
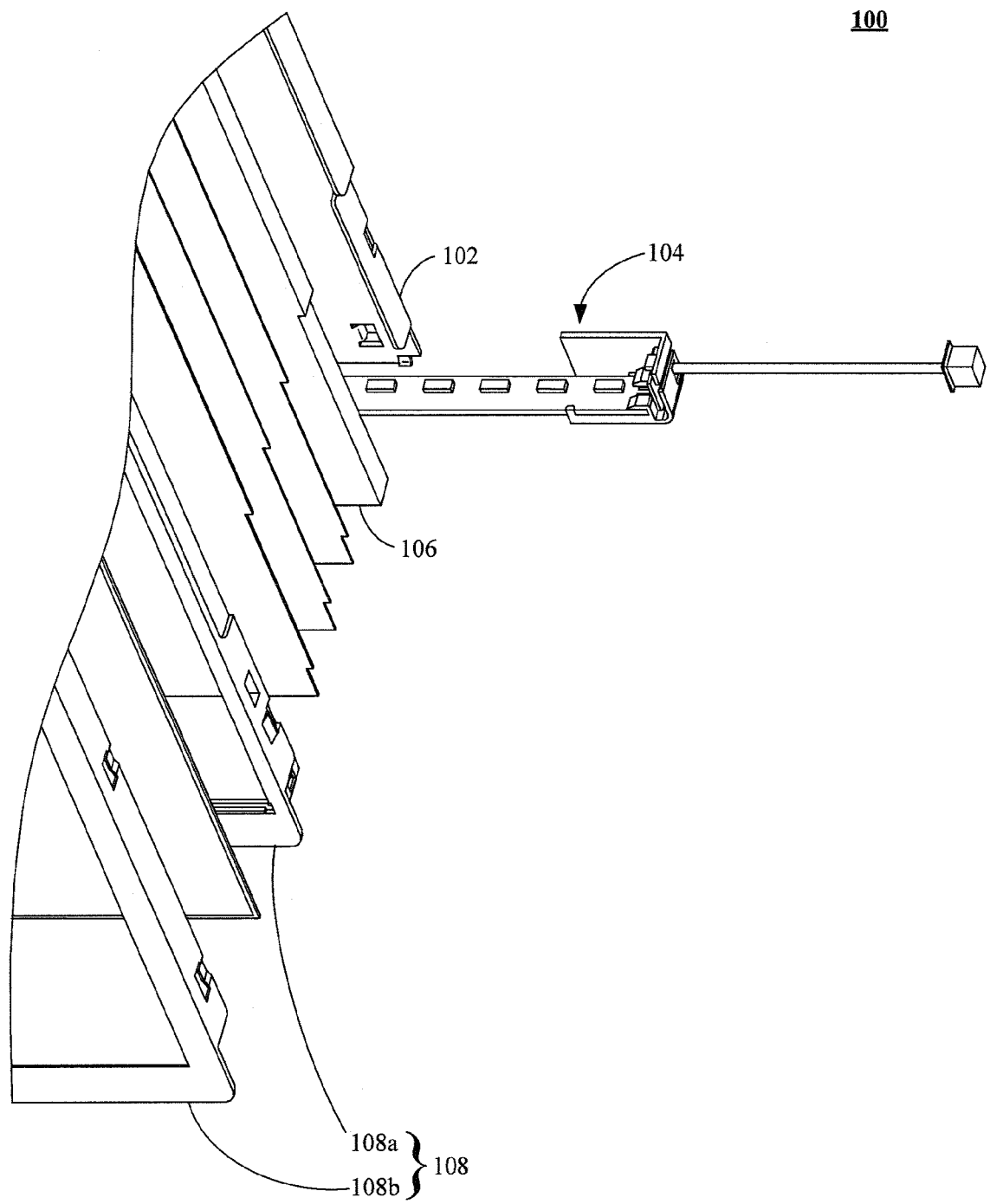
FIG. 1 is a partial exploded three-dimensional schematic view of a light module having a replaceable light apparatus according to one embodiment of the present invention.

FIG. 1 is a partial exploded three-dimensional schematic view of a light module 100 having a replaceable light apparatus 104 according to one embodiment of the present invention. The light module 100 includes a back plate 102, a replaceable light apparatus 104, a display module 106, a frame body 108 and a plurality of substance layers associated with the display module 106. The back plate 102 guides the replaceable light apparatus 104. The replaceable light apparatus 104 is positioned between the frame body 108 and the back plate 102 and the replaceable light apparatus 104 is adjacent to one side of the display module 106. The frame body 108 has a cover 108a and a base 108b. The base 108b connected to the cover 108a supports the replaceable light apparatus 104. The replaceable light apparatus 104 will be described in detail later. The replaceable light apparatus 104 in the present invention makes light system installation of the display flexible. In addition, the maintenance worker is capable of easily disassembling the replaceable light apparatus 104 from the display.

Figure 2A:
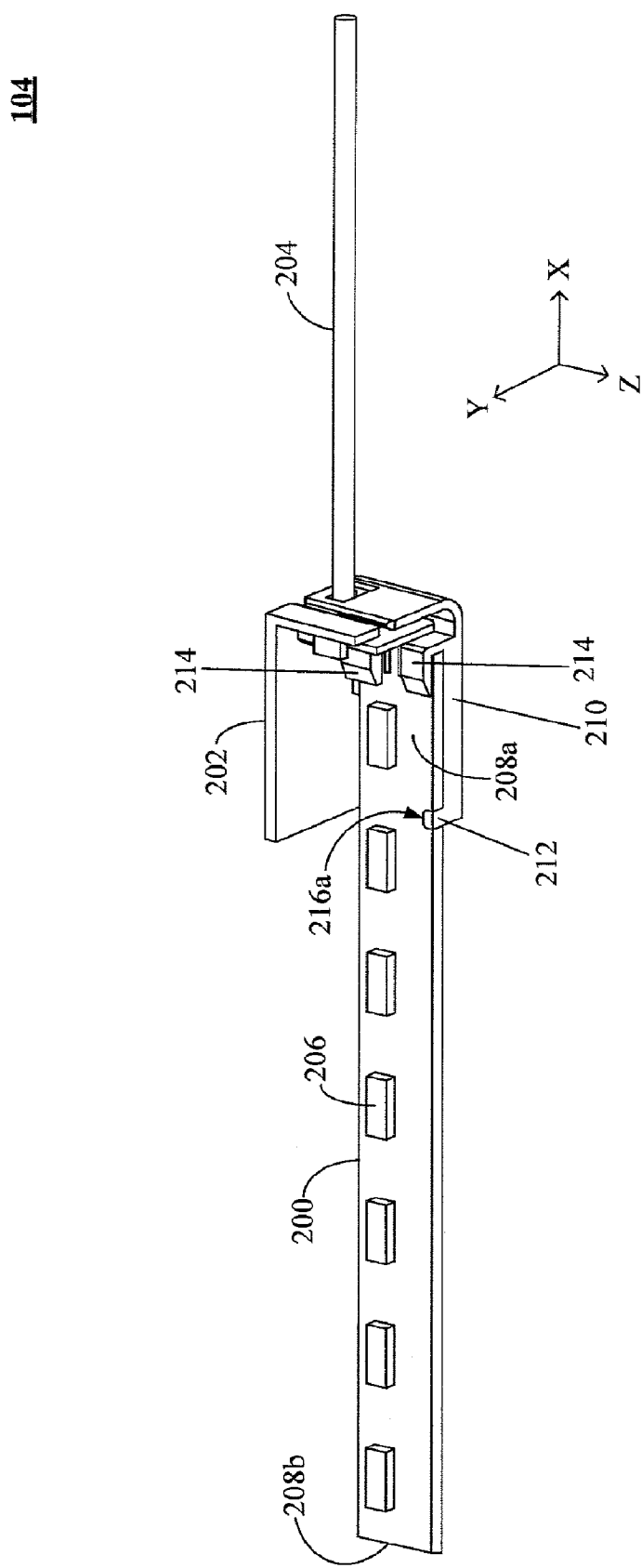
FIG. 2A is a three-dimensional schematic view of the securing device of the replaceable light apparatus shown in FIG. 1 in first visual angle according to one embodiment of the present invention.

Referring FIG. 1 and FIG. 2A, FIG. 2A is a three-dimensional schematic view of the replaceable light apparatus 104 shown in FIG. 1 in first visual angle according to one embodiment of the present invention. The replaceable light apparatus 104 includes a light control circuit 200, a securing device 202 and conducting wires 204. The light control circuit 200 is adapted to a frame body 108 and a back plate 102 of the backlight module 100. Additionally, the light control circuit 200 has a plurality of light sources 206, a first end portion 208a and a second end portion 208b.

The securing device 202 has a supporting housing 210 which has a position protrusion 212 and a clamping portion 214 for supporting the first end portion 208a of the light control circuit 200 along a first direction (X) and a third direction (Z). That is, the movement of the light control circuit 200 is restricted along the first direction (X) and the third direction (Z). The clamping portion 214 clamps the first end portion 208a of the light control circuit 200 along a second direction (Y) and a third direction (Z). That is, the clamping portion 214 restricts the movement of the light control circuit 200 to the second direction (Y) and the third direction (Z), as shown in FIG. 2A.

Therefore, while the light control circuit 200 is connected to the securing device 202, the light control circuit 200 and the securing device 202 stably construct the replaceable light apparatus 104 because the movement of the light control circuit 200 is restricted at the first direction (X), the second direction (Y) and the third direction (Z). In one preferred embodiment, the light control circuit 200 is a plurality of light emitting diodes (LEDs) which form a bar or plate shape. In another embodiment, the light control circuit 200 is composed of cold cathode fluorescent lamp (CCFL) or various light sources for the display.

Figure 2C:
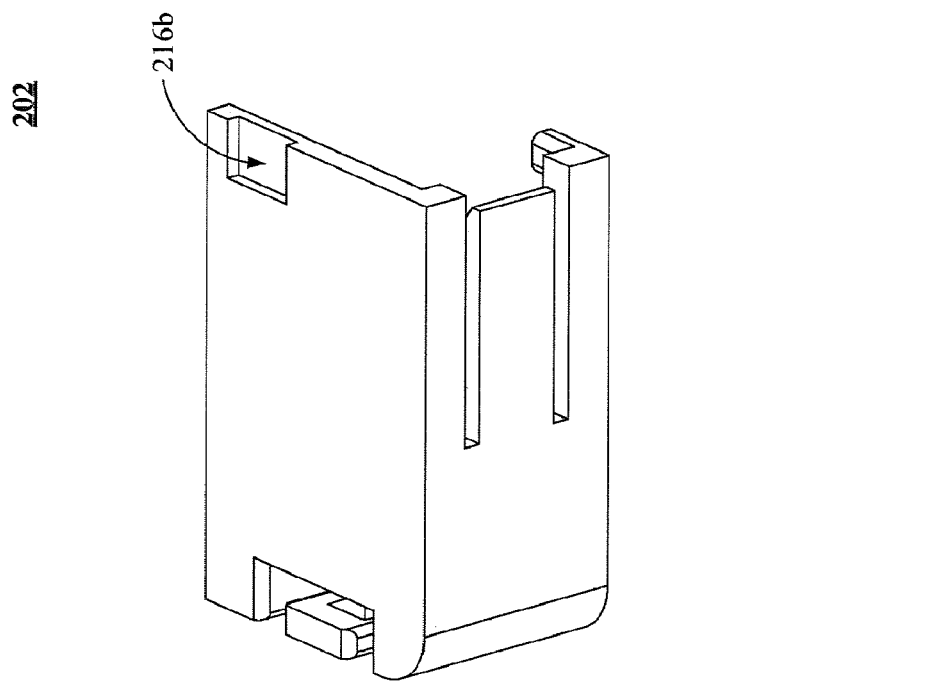
FIG. 2C is a three-dimensional schematic view of the replaceable light apparatus shown in FIG. 1 in third visual angle according to one embodiment of the present invention.
Figure 2B:
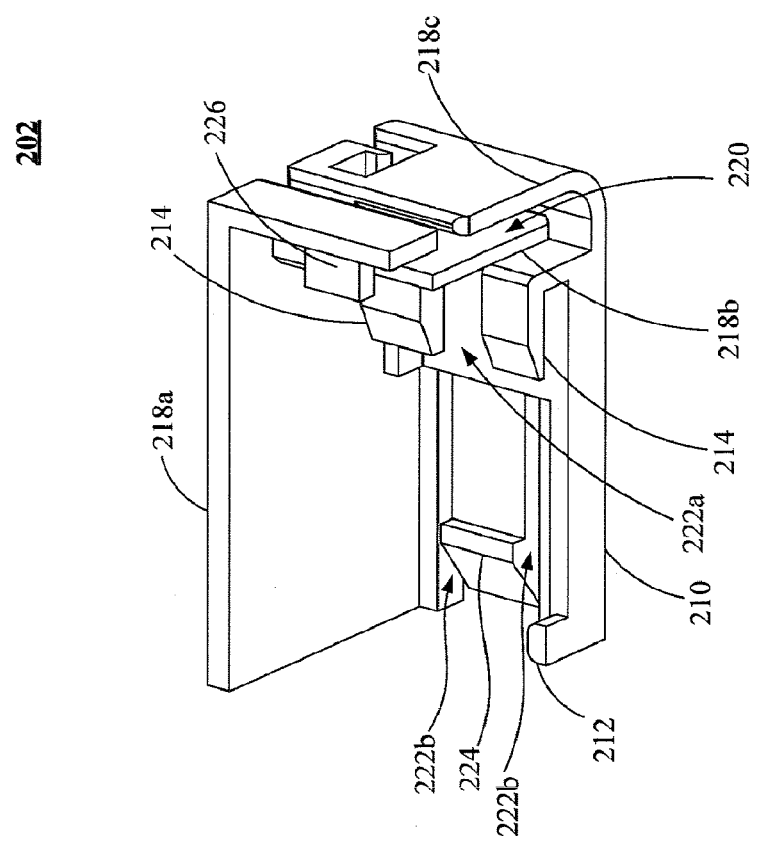
FIG. 2B is a three-dimensional schematic view of the securing device of the replaceable light apparatus shown in FIG. 1 in second visual angle according to one embodiment of the present invention.

Referring to FIGS. 2A, 2B and 2C, FIG. 2B is a three-dimensional schematic view of the securing device 202 of the replaceable light apparatus 104 shown in FIG. 1 in second visual angle according to one embodiment of the present invention; and FIG. 2C is a three-dimensional schematic view of the securing device 202 of the replaceable light apparatus 104 shown in FIG. 1 in third visual angle according to one embodiment of the present invention. The first end portion 208a of the light control circuit 200 further comprises a first recess region 216a for sustaining the position protrusion 212 of the securing device 202 by hooking the first recess region 216a to the position protrusion 212.

Figure 3:
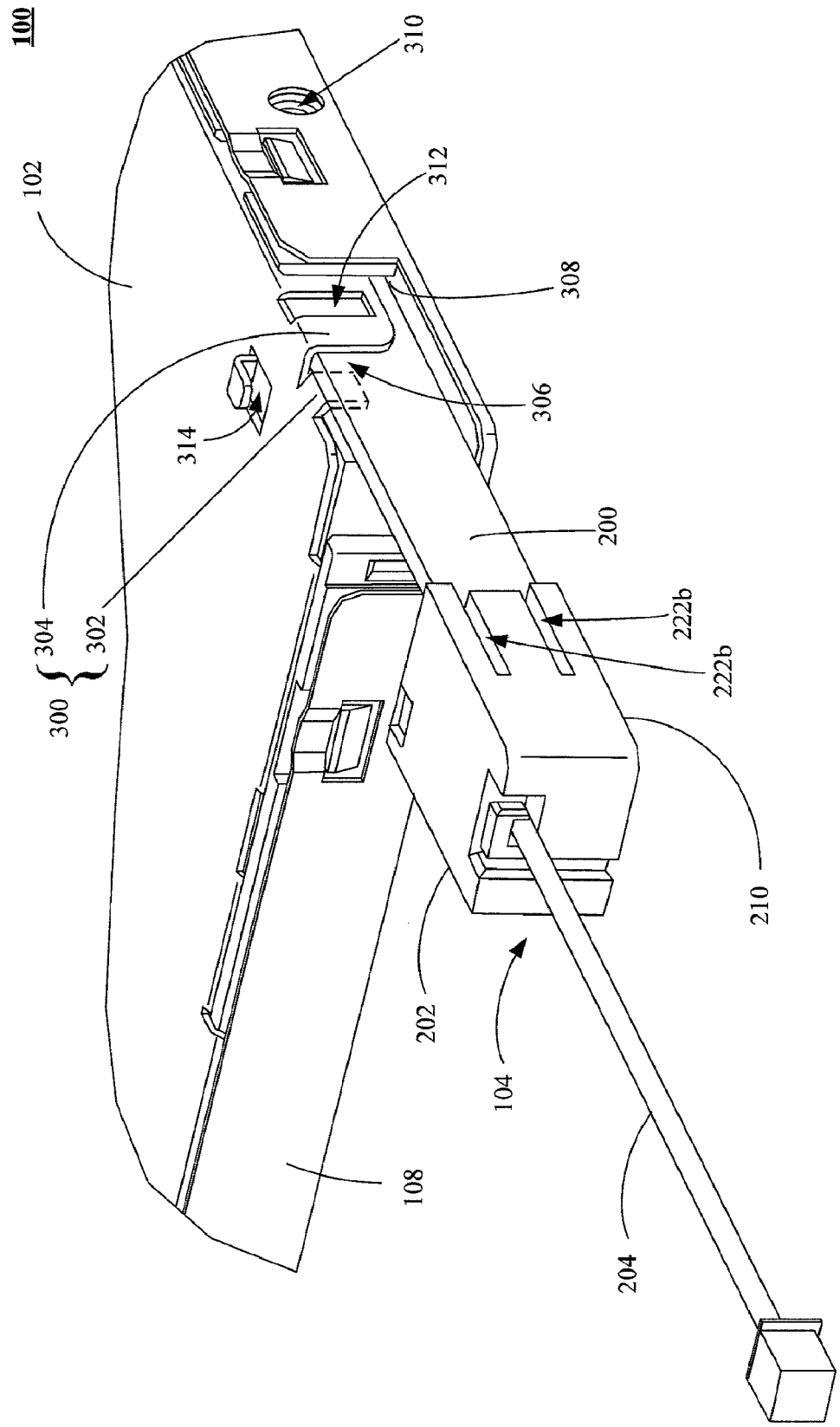
FIG. 3 is a partial three-dimensional schematic view of a light module having a replaceable light apparatus in first visual angle according to one embodiment of the present invention.

As shown in FIG. 2B, the securing device 202 of the replaceable light apparatus 104 further comprises a first side plate 218a, a second side plate 218b and a third side plate 218c. The first side plate 218a extends from the supporting housing 210 along the second direction (Y) for buckling one side of the first end portion 208a of the light control circuit 200 when the first recess region 216a hooks to the position protrusion 212. The first side plate 218a further comprises a second recess region 216b (shown in FIG. 2C) for allowing the back plate 102 to support the securing device 202 when the first side plate 218a is connected to the recess 314 (shown in FIG. 3) of the back plate 102. The second side plate 218b extends from the supporting housing 210 along the second direction (Y) for covering the frame body 108.

The third side plate 218c extends from the supporting housing 210 along the second direction (Y). Further, the second side plate 218b and the third side plate 218c construct a groove region (shown in FIG. 2B) 220 for containing a conducting wire (shown in FIG. 2A) 204 of the light control circuit 200. The groove region 220 guides the conducting wire 204 to the backlight module 100 externally for supplying power to the light control circuit 200. The third side plate 218c further comprises a position pin 226 extending from the third side plate 218c along the first direction (X) for allowing the securing device 202 to be secured to the frame body 108 of the backlight module 100.

The clamping portion 214 in the supporting housing 210 further comprises a first slot 222a for allowing an electrode of the first end portion 208a of the light control circuit 200 to be exposed to the first slot 222a when the light control circuit 200 connects to the securing device 202. Thus, the conducting wire 204 is easily directed to the groove region 220.

The securing device 202 further comprises a fastener 224 positioned in the supporting housing 210 for fastening the backlight module 100 to the back plate 102 when the light control circuit 200 connects to the securing device 202. The fastener 224 further comprises at least one second slot 222b for flexibly fastening the fastener to the back plate 102. For example, two second slots 222b are adjacent to the position protrusion 212 and the first side plate 218a, respectively. Preferably, two second slots 222b in the supporting housing 210 are formed along the first direction (X). As a result, the replaceable light apparatus 104 can be easily installed to the back plate 102 and/or the securing device 202 is disassembled from the back plate 102.

Figure 4:
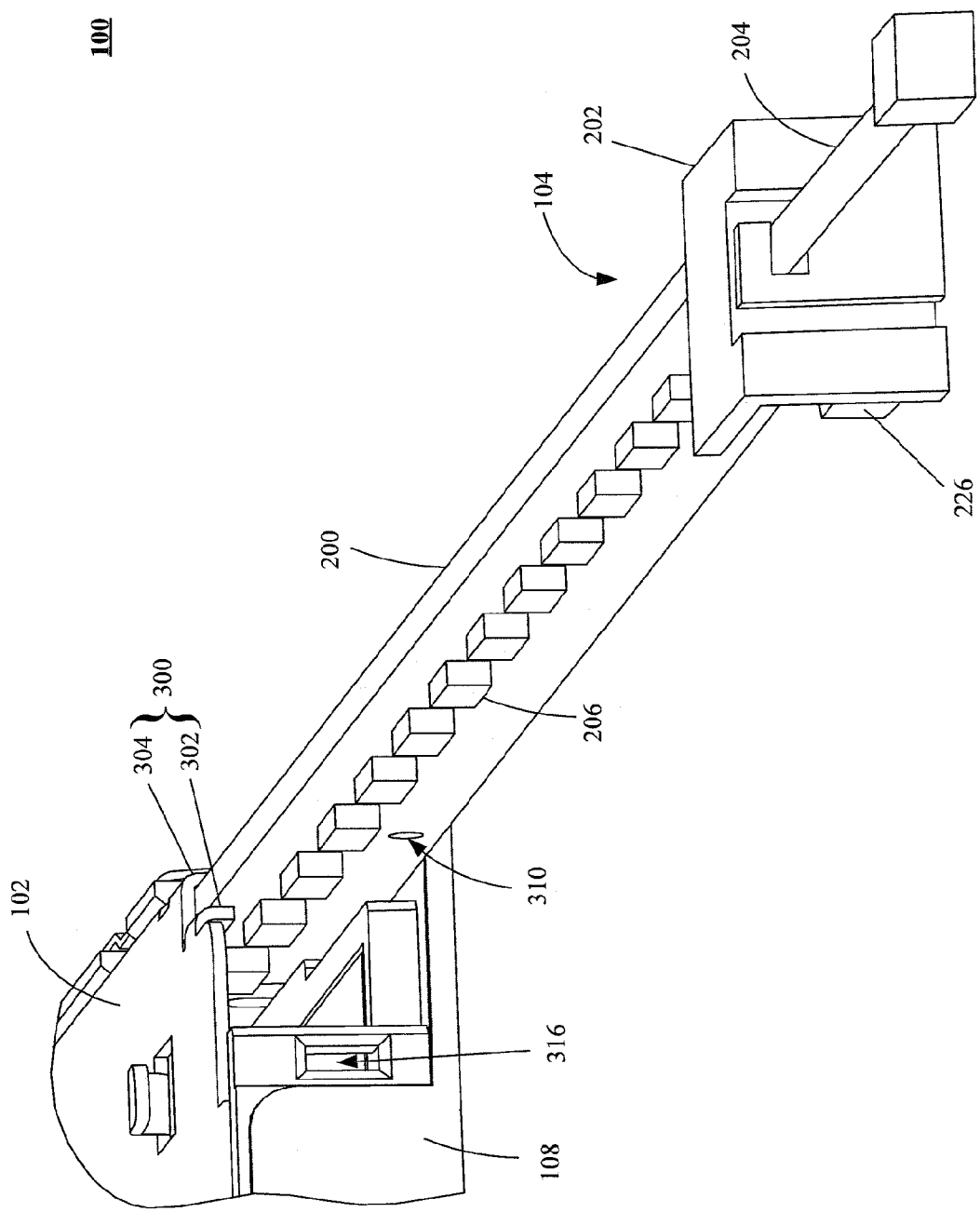
FIG. 4 is a partial three-dimensional schematic view of a light module having a replaceable light apparatus in second visual angle according to one embodiment of the present invention.

Referring to FIGS. 2A, 2B, 3, 4 and 5, FIG. 3 is a partial three-dimensional schematic view of a light module 100 having a replaceable light apparatus 104 in first visual angle according to one embodiment of the present invention; FIG. 4 is a partial three-dimensional schematic view of a light module 100 having a replaceable light apparatus 104 in second visual angle according to one embodiment of the present invention; and FIG. 5 is a partial three-dimensional schematic view of a light module 100 having a replaceable light apparatus 104 in third visual angle according to one embodiment of the present invention. The light module 100 includes the light control circuit 200, the securing device 202, a back plate 102 and a frame body 108. The back plate 102 guides the light control circuit 200 to the back plate 102 therein. The frame body 108 supports the light control circuit 200. The securing device 202 is shown in FIG. 2B.

The back plate 102 further comprises a guiding structure 300 having a guiding pole 302, a guiding side 304 and a stop device (not shown). The guiding pole 302 and the guiding side 304 construct an opening 306 for guiding the second end portion 208b of the light control circuit 200 to be positioned in the frame body 108 along the opening 306. While the replaceable light apparatus 104 is assembled, the light control circuit 200 relies on the guiding pole 302 and the light control circuit 200 is guided to the guiding side 304 until the stop device contacts the second end portion 208b of the light control circuit 200. In one embodiment, the frame body 108 further comprises a sliding track 308 for sliding the light control circuit 200 into the opening 306 and for moving along the sliding track 308 until the light control circuit 200 contacts the stop device.

In one embodiment, the light control circuit 200 further comprises a position hole 310 so that the light control circuit 200 is attached to the frame body 108 by screwing to the position hole 310 to increase the stability of the light control circuit 200 and the frame body 108. Therefore, the heat transfer rate of the light module 100 and the stability of the light incidence of the light system are improved. For example, the position hole 310 has a screw shape or the position hole 310 is formed by tapping device so that the light control circuit 200 can be attached to the frame body 108.

While the replaceable light apparatus 104 is put into the space between the back plate 102 and the frame body 108, the fastener 224 of the supporting housing 210 buckles a buckling hole 312 of the back plate 102. Further, at least one second slot 222b of the supporting housing 210 allows the fastener 224 to be flexibly buckled to the buckling hole 312. Moreover, the second recess region 216b in the first side plate 218a of the securing device 202 is plugged into the recess 314 so that the replaceable light apparatus 104 is fastened to the back plate 102 along the inverse direction of the first direction (X). In addition, the position pin 226 of the securing device 202 extends along the first direction (X) so that the securing device 202 is stably inserted to the insertion hole 316 of the frame body 108.

Consequently, the replaceable light apparatus 104 utilizes the fastener 224, the second recess region 216b and the position pin 226 to be coupled to the buckling hole 312, the recess 314 and the insertion hole 316, respectively. Thus, the replaceable light apparatus 104 tightly connects to the light module 102 and the frame body 108, respectively, for stably fastening the securing device 202 to the light module 100 and light leakage from the light module 102 and the frame body 108 is avoided.

In comparison with the prior art, the replaceable light apparatus in the present invention has more flexible in view of installation and maintenance for simplifying the manufacturing and maintaining processes of the display. Additionally, the light apparatus can be easily disassembled to increase the life span of the display device.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A replaceable light apparatus applicable to a backlight module, the replaceable light apparatus comprising:
   a light control circuit adapted to a frame body and a back plate of the backlight module and having a plurality of light sources, a first end portion and a second end portion; and
   a securing device having a supporting housing which has a position protrusion and a clamping portion, for supporting the first end portion of the light control circuit along a first direction and a third direction, wherein the clamping portion clamps the first end portion of the light control circuit along a second direction and the third direction.

2. The replaceable light apparatus of claim 1, wherein the first end portion of the light control circuit further comprises a first recess region for sustaining the position protrusion of the securing device.

3. The replaceable light apparatus of claim 1, wherein the securing device further comprises a first side plate extending from the supporting housing along the second direction for buckling one side of the first end portion of the light control circuit.

4. The replaceable light apparatus of claim 3, wherein the first side plate further comprises a second recess region for allowing the back plate to support the securing device.

5. The replaceable light apparatus of claim 1, wherein the securing device further comprises a second side plate extending from the supporting housing along the second direction for covering the frame body.

6. The replaceable light apparatus of claim 5, wherein the securing device further comprises a third side plate extending from the supporting housing along the second direction, and the second side plate and the third side plate construct a groove region for containing a conducting wire of the light control circuit.

7. The replaceable light apparatus of claim 6, wherein the third side plate further comprises a position pin extending from the third side plate along the first direction for allowing the securing device to be secured to the frame body of the backlight module.

8. The replaceable light apparatus of claim 1, wherein the clamping portion in the supporting housing further comprises a first slot for allowing an electrode of the first end portion of the light control circuit to be exposed to the first slot.

9. The replaceable light apparatus of claim 1, wherein the securing device further comprises a fastener positioned in the supporting housing for fastening the backlight module to the back plate.

10. The replaceable light apparatus of claim 9, wherein the fastener further comprises at least one second slot for flexibly fastening the fastener to the back plate.

11. A backlight module applicable to a liquid crystal display, the backlight module comprising:
    a light control circuit having a plurality of light sources, a first end portion and a second end portion;
    a securing device having a supporting housing which has a position protrusion and a clamping portion, for supporting the first end portion of the light control circuit along a first direction and a third direction, wherein the clamping portion clamps the first end portion of the light control circuit along a second direction and the third direction;
    a back plate for guiding the light control circuit to the back plate therein; and
    a frame body for supporting the light control circuit.

12. The backlight module of claim 11, wherein the first end portion of the light control circuit further comprises a first recess region for sustaining the position protrusion of the securing device.

13. The backlight module of claim 11, wherein the securing device further comprises a first side plate extending from the supporting housing along the second direction for buckling one side of the first end portion of the light control circuit.

14. The backlight module of claim 13, wherein the first side plate further comprises a second recess region for allowing the back plate to support the securing device.

15. The backlight module of claim 11, wherein the securing device further comprises a second side plate extending from the supporting housing along the second direction for covering the frame body.

16. The backlight module of claim 15, wherein the securing device further comprises a third side plate extending from the supporting housing along the second direction, and the second side plate and the third side plate construct a groove region for containing a conducting wire of the light control circuit.

17. The backlight module of claim 16, wherein the third side plate further comprises a position pin extending from the third side plate along the first direction for allowing the securing device to be secured to the frame body of the backlight module.

18. The backlight module of claim 11, wherein the clamping portion in the supporting housing further comprises a first slot for allowing an electrode of the first end portion of the light control circuit to be exposed to the first slot.

19. The backlight module of claim 11, wherein the securing device further comprises a fastener positioned in the supporting housing for fastening the backlight module to the back plate.

20. The backlight module of claim 19, wherein the fastener further comprises at least one second slot for flexibly fastening the fastener to the back plate.

21. The backlight module of claim 11, wherein the back plate further comprises a guiding structure having a guiding pole and a guiding side which construct an opening for guiding the second end portion of the light control circuit to be positioned in the frame body along the opening.

22. The backlight module of claim 21, wherein the frame body further comprises a sliding track for sliding the light control circuit into the opening and moving along the sliding track.

* * * * *